United States Patent
Kang et al.

(10) Patent No.: US 8,845,917 B2
(45) Date of Patent: Sep. 30, 2014

(54) SOUNDPROOFING NANOCLAY COMPOSITE AND METHOD OF MANUFACTURING THE SAME

(75) Inventors: Yeon June Kang, Seongnam-si (KR); Sung Hoon Ahn, Seongnam-si (KR); Jae Chul Lee, Seoul (KR); Jun Yan, Seoul (KR)

(73) Assignee: SNU R&DB Foundation, Seoul (KR)

( * ) Notice: Subject to any disclaimer, the term of this patent is extended or adjusted under 35 U.S.C. 154(b) by 209 days.

(21) Appl. No.: 13/384,217

(22) PCT Filed: Jul. 15, 2010

(86) PCT No.: PCT/KR2010/004605
§ 371 (c)(1),
(2), (4) Date: Jan. 13, 2012

(87) PCT Pub. No.: WO2011/010830
PCT Pub. Date: Jan. 27, 2011

(65) Prior Publication Data
US 2012/0112118 A1    May 10, 2012

(30) Foreign Application Priority Data
Jul. 24, 2009    (KR) .................. 10-2009-0068079

(51) Int. Cl.
*C08L 23/12*    (2006.01)
*C08K 3/00*    (2006.01)
*C08J 3/00*    (2006.01)
*C08J 3/205*    (2006.01)
C08K 3/34    (2006.01)
C08L 23/10    (2006.01)

(52) U.S. Cl.
CPC .................. *C08J 3/205* (2013.01); *C08K 3/346* (2013.01); *C08K 2201/011* (2013.01); *C08J 2323/10* (2013.01); *C08L 23/10* (2013.01); *Y10S 977/783* (2013.01)
USPC ............. 252/62; 524/442; 524/445; 524/447; 977/783

(58) Field of Classification Search
USPC .............. 977/783; 252/62; 524/442, 445, 447
See application file for complete search history.

(56) References Cited

U.S. PATENT DOCUMENTS 6,646,026 B2 * 11/2003 Fan et al. ...................... 523/205
7,888,419 B2    2/2011 Cooper et al.
(Continued)

FOREIGN PATENT DOCUMENTS

JP    2009507945 A    2/2009
KR    20040067447 A    7/2004
(Continued)

OTHER PUBLICATIONS

Derwent citation2010-F97800 for KR 958551 B1, May 18, 2010.*
(Continued)

*Primary Examiner* — Carol M Koslow
(74) *Attorney, Agent, or Firm* — Murabito, Hao & Barnes LLP; Andrew D. Fortney

(57) ABSTRACT

Disclosed is a method of manufacturing soundproofing composite, and a soundproofing composite manufactured by the aforementioned method, the method comprising preparing a mixture by dissolving PP resin and nanoclay in a solvent; and volatilizing the solvent from the mixture. According to the present invention, the composite is manufactured by dissolving PP resin and nanoclay, to thereby realize great stiffness and soundproofing properties.

13 Claims, 2 Drawing Sheets

(56) References Cited

U.S. PATENT DOCUMENTS

| | | |
|---|---|---|
| 2007/0106006 A1 | 5/2007 | Cooper et al. |
| 2008/0194406 A1 | 8/2008 | Price et al. |
| 2011/0160345 A1 | 6/2011 | Cooper et al. |

FOREIGN PATENT DOCUMENTS

| | | | |
|---|---|---|---|
| KR | 100545402 B1 | | 1/2006 |
| KR | 100690194 B1 | | 2/2007 |
| WO | 2004065480 A1 | | 8/2004 |
| WO | WO 2004/065480 | * | 8/2004 |
| WO | WO 2005/068364 | * | 7/2005 |
| WO | 2007048018 A2 | | 4/2007 |
| WO | 2007142663 A2 | | 12/2007 |

OTHER PUBLICATIONS

Translations of the claims of KR 958551 B1, May 18, 2010.*

* cited by examiner

SOUNDPROOFING NANOCLAY COMPOSITE AND METHOD OF MANUFACTURING THE SAME

TECHNICAL FIELD

The present invention relates to a soundproofing material, and more particularly, to a soundproofing composite.

BACKGROUND ART

In recent days, noise has been regarded as industrial pollution produced in accordance with an industrial development. The noise is produced by various reasons, and methods for removing the noise have been actively researched and studied.

The noise removal can be attained through high absorption and shielding efficiencies according to a frequency of noise resource. In order to attain the high absorption and shielding efficiencies, both structural and material aspects have been researched and studied. As a result of the material research for the noise removal, there are porous materials, fabric materials, and composite materials.

Also, the essentials to the material used for the noise removal are the mechanical property such as high stiffness, and good yield in mass production as well as the soundproofing property such as high absorption and shielding efficiencies.

Up to now, even though the composite material has been researched to be used as the soundproofing composite for the noise removal, the optimal composite material which is capable of satisfying the aforementioned good soundproofing property, high stiffness, and good yield in mass production has not been proposed yet. Thus, there is the continuous need to develop the optimal composite material for satisfying the aforementioned good soundproofing property, high stiffness, and good yield in mass production.

DISCLOSURE

Technical Problem

Therefore, the present invention has been made in view of the above problems, and it is an object of the present invention to provide a soundproofing composite and a method of manufacturing the same, which is capable of preventing one or more problems of the related art.

Another object of the present invention is to provide a soundproofing composite and a method of manufacturing the same, which facilitates to realize good soundproofing efficiency, high stiffness, and good yield in mass production.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

To achieve these objects and other advantages and in accordance with the purpose of the invention, as embodied and broadly described herein, there is provided a method of manufacturing soundproofing composite comprising: preparing a mixture by dissolving PP resin and nanoclay in a solvent; and volatilizing the solvent from the mixture.

At this time, the process of preparing a mixture comprises adding the nanoclay to be contained at 1~15 wt % of the entire weight of PP resin and nanoclay.

Also, the process of preparing a mixture comprises adjusting a content ratio of PP resin to solvent by weight to 1:3~1:5.

The solvent is prepared using xylene.

The process of volatilizing the solvent from the mixture comprises adjusting the remaining solvent content at 0.5~2 wt % of the entire composite weight.

In another aspect of the present invention, there is provided a soundproofing composite comprising PP resin and nanoclay.

At this time, the nanoclay is contained at 1~15 wt % of the entire weight of PP resin and nanoclay.

Also, the nanoclay is contained at 2~10 wt % of the entire weight of PP resin and nanoclay.

In addition, the soundproofing composite contains the remaining solvent at 0.5~2 wt % of the entire composite weight.

Advantageous Effects

According to the present invention, a composite material is produced by dispersing nanoclay in PP resin with great stiffness, to thereby result in great soundproofing property.

When producing the mixture by dissolving PP resin and nanoclay in a solvent, the nanoclay is added to be contained within 1~15 wt % of the entire weight of PP resin and nanoclay, so that it is possible to minimize lowering of the stiffness property in the composite, and simultaneously to obtain the desired soundproofing property.

Also, a drying process of volatilizing the solvent from the mixture is carried out at 50 to 70° C. for 45 to 55 hours, so that it is possible to minimize lowering of the stiffness property in the composite, and to prevent deterioration of productivity by the increase of drying duration.

BEST MODE

Figure 1:
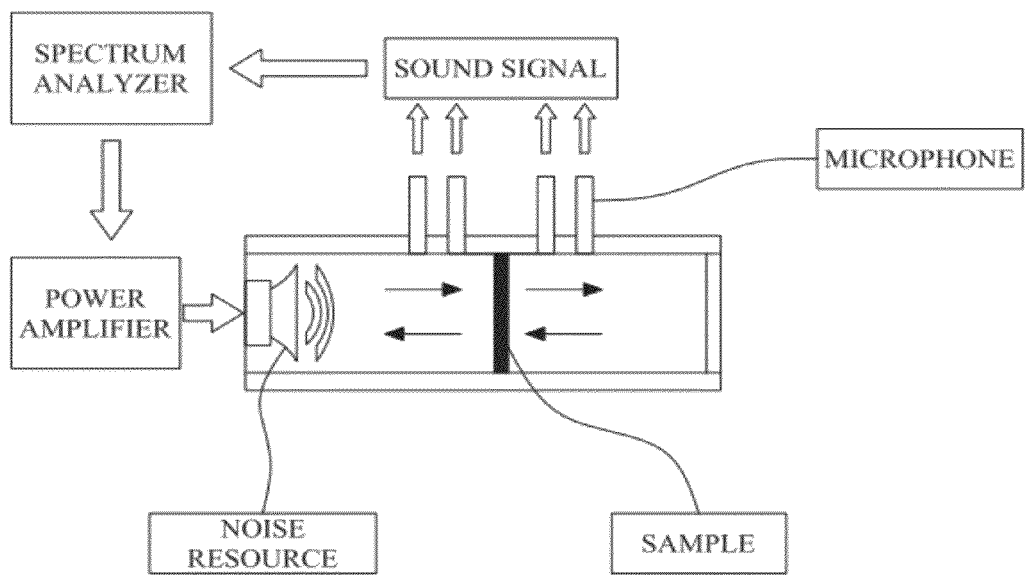
FIG. 1 is a schematic view illustrating a soundproofing-level measurement apparatus according to the present invention.

Reference will now be made in detail to the preferred embodiments of the present invention, examples of which are illustrated in the accompanying drawings. Wherever possible, the same reference numbers will be used throughout the drawings to refer to the same or like parts.

Hereinafter, soundproofing nanoclay composite according to the present invention and a method of manufacturing the same will be described as follows.

First, a mixture is manufactured by dissolving polypropylene (PP) resin and nanoclay in a solvent.

The mixture containing PP resin and nanoclay may be manufactured by a melt-blending method or solution-blending method. In case of the melt-blending method, the PP resin is heated to attain a melting point, and is then mixed with the nanoclay. In case of the solution-blending method, the PP resin and nanoclay are mixed in a predetermined solvent at a temperature not more than a melting point. The present invention may use the solution-blending method which needs not the heating process to attain the melting point for preparation of the mixture, wherein the solution-blending method of the present invention is carried out through the use of xylene as an optimal solvent for dissolution of the PP resin.

The xylene used as the solvent is capable of melting the PP resin with easiness. Furthermore, since the xylene is volatile, that is, the xylene has a low boiling point, it allows easy removal of the solvent after completing the preparation of mixture.

The process of manufacturing the mixture may include a stirring process. For the stirring process, an ultrasonic treatment may be carried out additionally. If the ultrasonic treatment is carried out additionally, a dissolving duration may be shortened owing to the improved solubility of the PP resin and nanoclay. Also, If the ultrasonic treatment is carried out additionally, the PP resin and nanoclay can be uniformly dispersed in the solvent.

The PP resin is advantageous in that it has great impact-resisting and heat-resisting properties. Thus, the PP resin may be used for various components of automobile and electric devices. Preferably, the PP resin is added to the solvent in that a content ratio of PP resin to solvent by weight is 1:3~1:5. This content ratio enables to prevent a viscosity of the PP resin from being lowered for the aforementioned stirring process.

The nanoclay is provided to improve a soundproofing property of finally-obtained composite. Preferably, the nanoclay is added to be contained within 1~15 wt % of the entire weight of PP resin and nanoclay. If the nanoclay is added to be less than 1 wt %, the soundproofing property of the composite is not sufficiently improved. Meanwhile, if the nanoclay is added to be more than 15 wt %, the soundproofing property of the composite is ineffectual, and a stiffness property is also lowered. And more preferably, the nanoclay is added to be contained within 2~10 wt % of the entire weight of PP resin and nanoclay, which will be described with the following embodiments of the present invention.

Then, the solvent is volatilized from the manufactured mixture.

In consideration for the stiffness property of the composite, it is preferable to minimize the remaining solvent content after the volatilizing process of the solvent. For minimizing the remaining solvent content, it requires a long heat process for volatilizing the solvent. In this case, productivity in mass production might be lowered due to the long heat process. Thus, when taking both the stiffness property of composite and productivity of mass production into consideration, the solvent volatilizing process is adjusted such that the remaining solvent content is 0.5~2 wt % of the entire composite weight, to thereby minimize lowering of the stiffness property in the composite, and simultaneously to prevent the deteriorated productivity in the mass production. The solvent volatilizing process may comprise heating the composite at 50~70° C. for 45~55 hours.

Hereinafter, various embodiments and comparative examples will be described as follows.

Embodiment 1

A mixture is prepared by mixing 100 g of PP resin (produced by Samsung Chemicals) having 1.145 g/cc density, 1 g of nanoclay (produced by Southern Clay Products) having 1.90 g/cc density, and 0.1 g of maleic anhydride in 1000 mL round flask filled with 400 mL of xylene (produced by Daejung Chemicals) at a room temperature (about 20° C.), wherein the maleic anhydride is used to accelerate a speed of mixing the PP resin and the nanoclay.

Then, the prepared mixture is rotated at 300 rpm on a hot plate of 135° C. for 2 hours through the use of PTFE stirrer.

After that, the prepared mixture is mixed with 600 mL of ethanol, and is then applied through the use of Buchner funnel, to thereby obtain a lump of the mixture.

Then, the obtained lump of the mixture is dried in an oven of 60° C. for 50 hours, and is then cut to be a size suitable for an injection molding apparatus, to thereby obtain the final composite with a desired size.

Embodiment 2

A composite is obtained by the same process and method as the aforementioned Embodiment 1 except that 3 g of nanoclay is used.

Embodiment 3

A composite is obtained by the same process and method as the aforementioned Embodiment 1 except that 5 g of nanoclay is used.

Embodiment 4

A composite is obtained by the same process and method as the aforementioned Embodiment 1 except that 7 g of nanoclay is used.

Embodiment 5

A composite is obtained by the same process and method as the aforementioned Embodiment 1 except that 9 g of nanoclay is used.

Embodiment 6

A composite is obtained by the same process and method as the aforementioned Embodiment 1 except that 11 g of nanoclay is used.

Embodiment 7

A composite is obtained by the same process and method as the aforementioned Embodiment 1 except that 13 g of nanoclay is used.

Embodiment 8

A composite is obtained by the same process and method as the aforementioned Embodiment 1 except that 15 g of nanoclay is used.

The important process conditions of the aforementioned Embodiments 1~8 of the present invention will be briefly described in the following table 1.

TABLE 1

|  | Added amount of PP resin (weight/g) | Added amount of nanoclay (weight/g) | Added amount of xylene (volume/mL) | Weight ratio of nanoclay (wt %) |
|---|---|---|---|---|
| Embodiment 1 | 100 | 1 | 400 | 0.99 |
| Embodiment 2 | 100 | 3 | 400 | 2.97 |
| Embodiment 3 | 100 | 5 | 400 | 4.95 |
| Embodiment 4 | 100 | 7 | 400 | 6.92 |
| Embodiment 5 | 100 | 9 | 400 | 8.90 |
| Embodiment 6 | 100 | 11 | 400 | 10.88 |
| Embodiment 7 | 100 | 13 | 400 | 12.86 |
| Embodiment 8 | 100 | 15 | 400 | 14.84 |

In the above table 1, a density of PP resin is 1.145 g/cc; a density of nanoclay is 1.90 g/cc; and the weight ratio of nanoclay corresponds to the content of nanoclay in the entire weight of PP resin and nanoclay.

Comparative Example

PP resin is prepared as the comparative example.

Thereafter, the following tests are carried out through the use of samples according to the aforementioned embodiments and comparative examples.

(1) Measuring Soundproofing Property

Samples are prepared by applying an injection molding process to the composites of the Embodiments 1~8 and the PP resin of the comparative example, wherein each sample has 29.25 mm outside diameter and 3.0 mm thickness.

Then, the soundproofing property for each sample is measured through the use of soundproofing-level measurement apparatus shown in FIG. 1. The soundproofing-level measurement apparatus of FIG. 1 is capable of showing a transmission loss as a decibel (dB) unit through the decrease of energy provided from a noise resource, wherein the maximum measured decibel is 6.4 KHz. This process of measuring the soundproofing property in each sample is repeated 3 times, and then its average value is calculated, which will be shown in FIG. 2.

Figure 2:
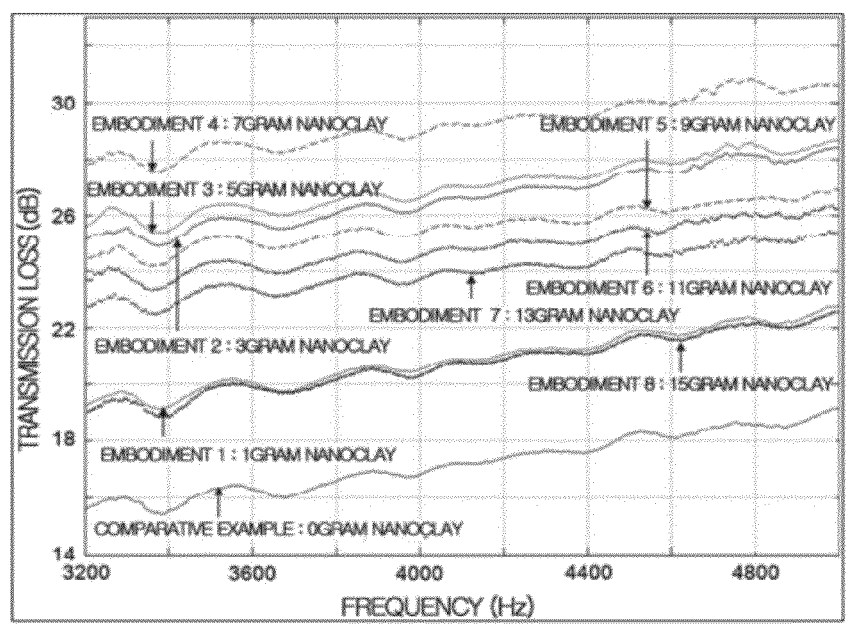
FIG. 2 is a graph illustrating soundproofing levels for respective samples through the use of soundproofing-level measurement apparatus of FIG. 1.

As known from FIG. 2, the transmission loss of the Embodiment using the composite of PP resin and nanoclay is increased in comparison to the comparative example using only PP resin. Accordingly, the soundproofing property of the Embodiment is more improved than the soundproofing property of the comparative example.

According as the content of nanoclay is gradually increased from the Embodiment 1 to Embodiment 4, the soundproofing property is gradually increased in proportion to the increased content of nanoclay. For example, in case of the Embodiment 4, noise is decreased by 11 dB at maximum. However, even though the content of nanoclay in the Embodiment 5 to Embodiment 8 is increased more than the content of nanoclay in the Embodiment 4, the soundproofing property of the Embodiments 5~8 is not higher than that of the Embodiment 4.

(2) Measuring Tensile Strength

Samples are prepared by applying an injection molding process to the composites of the Embodiments 1~8 and the PP resin of the comparative example.

Then, elastic modulus (GPa) and ultimate tensile strength (MPa) for each sample may be measured in ASTM D638-03 testing method, which will be shown in the following FIGS. 3 and 4.

Figure 3:
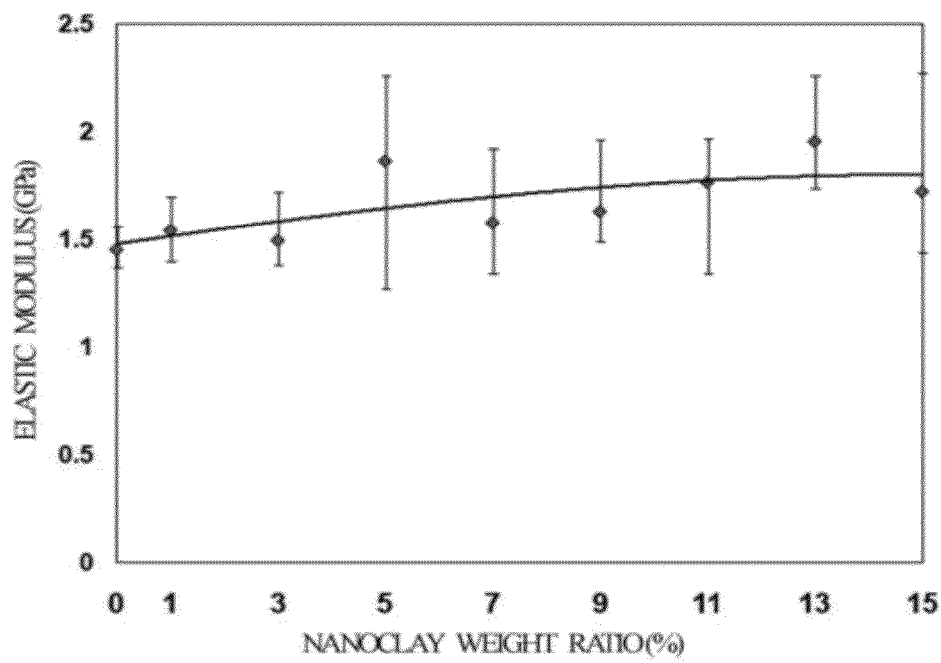
FIG. 3 is a graph illustrating elastic modulus (GPa) measured in each sample by ASTM D638-08 testing method.
Figure 4:
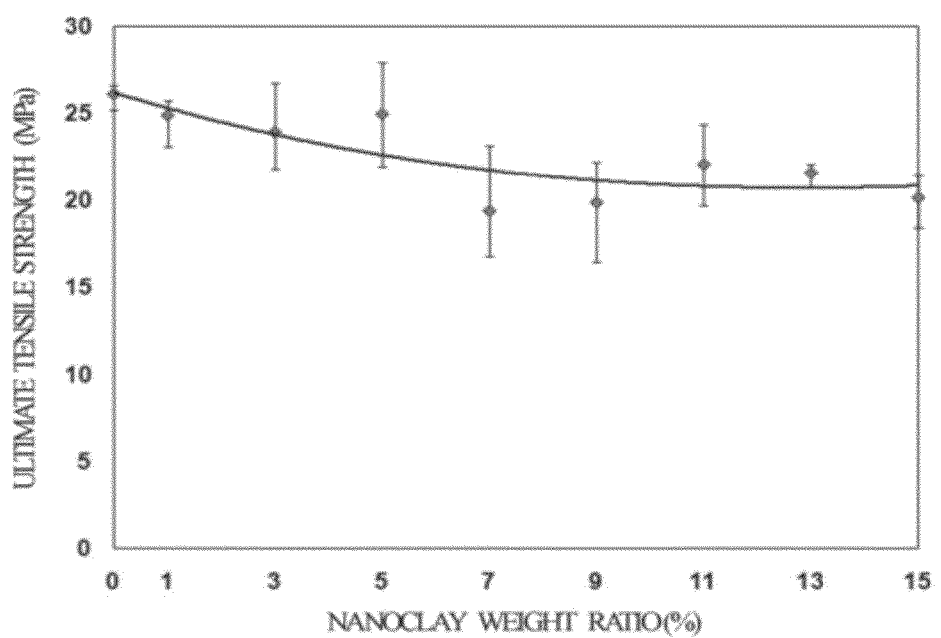
FIG. 4 is a graph illustrating ultimate tensile strength (MPa) measured in each sample by ASTM D638-08 testing method.

As shown in FIGS. 3 and 4, the ultimate tensile strength in the Embodiment using the composite of PP resin and nanoclay is slightly lower than the ultimate tensile strength in the comparative example using only PP resin, whereby stiffness of the Embodiment is slightly lower than that of the comparative example.

As known from results of the Embodiments 1~8, the stiffness is improved according as the content of nanoclay is gradually increased, while strength is slightly lowered according as the content of nanoclay is gradually increased.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of manufacturing a soundproofing composite, comprising:
preparing a mixture by dissolving a PP resin and a nanoclay in a solvent; and
volatilizing the solvent from the mixture, wherein volatilizing the solvent from the mixture comprises adjusting the solvent content to 0.5~2 wt % of the soundproofing composite.

2. The method according to claim 1, wherein preparing the mixture comprises adding the nanoclay in an amount of 1~15 wt % of an entire weight of the PP resin and the nanoclay.

3. The method according to claim 1, wherein preparing the mixture comprises adjusting a weight ratio of the PP resin to the solvent to 1:3~1:5.

4. The method according to claim 1, wherein the solvent is xylene.

5. The method of claim 1, wherein the solvent is volatilized from the mixture at 50 to 70° C. for 45 to 55 hours.

6. The method of claim 1, wherein preparing the mixture comprises a stirring process.

7. The method of claim 6, further comprising an ultrasonic treatment.

8. The method of claim 1, wherein the mixture further comprises 0.09-0.1 wt. % of maleic anhydride based on a total weight of the PP resin, the nanoclay and the maleic anhydride.

9. A soundproofing composite comprising PP resin, a nanoclay, and a solvent in an amount of 0.5~2 wt % of the soundproofing composite.

10. The soundproofing composite according to claim 9, wherein the nanoclay is present in an amount of 1~15 wt % of an entire weight of the PP resin and the nanoclay.

11. The soundproofing composite according to claim 9, wherein the nanoclay is present in an amount of 2~10 wt % of an entire weight of the PP resin and the nanoclay.

12. The soundproofing composite of claim 9, wherein the solvent is xylene.

13. The soundproofing composite of claim 9, wherein the nanoclay has a density of 1.90 g/cc.

* * * * *